(12) United States Patent
Mak

(10) Patent No.: US 8,192,588 B2
(45) Date of Patent: Jun. 5, 2012

(54) DEVICES AND METHODS FOR WATER REMOVAL IN DISTILLATION COLUMNS

(75) Inventor: John Mak, Santa Ana, CA (US)

(73) Assignee: Fluor Technologies Corporation, Aliso Viejo, CA (US)

(*) Notice: Subject to any disclaimer, the term of this patent is extended or adjusted under 35 U.S.C. 154(b) by 53 days.

(21) Appl. No.: 12/672,390

(22) PCT Filed: Aug. 28, 2008

(86) PCT No.: PCT/US2008/010256
§ 371 (c)(1),
(2), (4) Date: Feb. 15, 2010

(87) PCT Pub. No.: WO2009/032200
PCT Pub. Date: Mar. 12, 2009

(65) Prior Publication Data
US 2011/0192805 A1 Aug. 11, 2011

Related U.S. Application Data

(60) Provisional application No. 60/968,622, filed on Aug. 29, 2007.

(51) Int. Cl.
B01D 3/42 (2006.01)
C02F 1/02 (2006.01)
C10G 33/08 (2006.01)

(52) U.S. Cl. ........ 203/1; 159/44; 159/47.1; 159/DIG. 1; 196/46; 196/121; 196/132; 196/141; 202/160; 203/2; 203/10; 203/14; 203/98; 208/187; 210/137; 210/149; 210/175; 210/513; 210/742; 210/774

(58) Field of Classification Search ............... 196/46, 196/121, 132, 141; 159/37, 44, 47.1, DIG. 1, 159/DIG. 25; 202/160, 204; 203/1, 2, 10, 203/14, 98; 208/187; 210/137, 149, 175, 210/513, 742, 774

See application file for complete search history.

(56) References Cited

U.S. PATENT DOCUMENTS

| 1,660,235 | A | * | 2/1928 | Kellar | ............... | 516/139 |
|---|---|---|---|---|---|---|
| 3,947,327 | A | * | 3/1976 | Greenfield et al. | ............... | 203/7 |
| 4,088,578 | A | | 5/1978 | Yoshioka et al. | | |
| 4,089,662 | A | | 5/1978 | Williams | | |
| 4,359,386 | A | | 11/1982 | Crema | | |
| 4,594,155 | A | * | 6/1986 | Conway | ............... | 210/115 |
| 4,722,800 | A | * | 2/1988 | Aymong | ............... | 210/802 |
| 5,100,546 | A | | 3/1992 | Broussard, Sr. | | |
| 5,188,742 | A | | 2/1993 | Shurtleff | | |
| 5,368,700 | A | | 11/1994 | Bachmann | | |
| 5,962,763 | A | * | 10/1999 | Cossee et al. | ............... | 585/818 |
| 5,980,694 | A | * | 11/1999 | Apeldoorn et al. | ............... | 202/152 |
| 6,042,718 | A | * | 3/2000 | Bland et al. | ............... | 208/187 |
| 6,071,420 | A | * | 6/2000 | Martinsen | ............... | 210/774 |
| 2006/0186056 | A1 | | 8/2006 | Ivan | | |

* cited by examiner

Primary Examiner — Virginia Manoharan
(74) Attorney, Agent, or Firm — Fish & Associates, PC

(57) ABSTRACT

Water is removed from oily water produced during operation of a separation column by withdrawing the oily water from the column during separation into an external separator where the oily water is separated into a water phase and an oily phase. The oily phase is then heated to a temperature effective to produce a density differential that drives the oily phase back into the operating column.

13 Claims, 1 Drawing Sheet

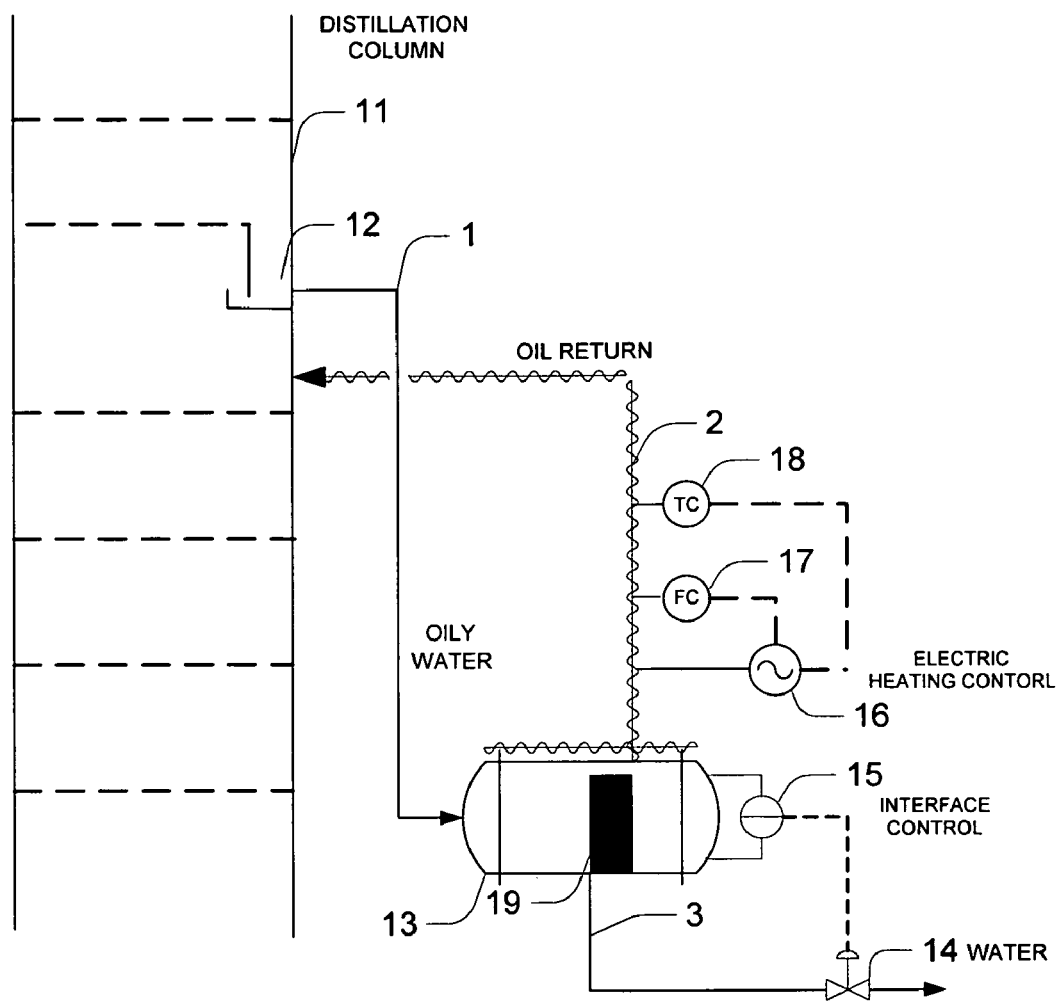

DEVICES AND METHODS FOR WATER REMOVAL IN DISTILLATION COLUMNS

This application claims priority to our U.S. provisional application with the Ser. No. 60/968,622, which was filed Aug. 29, 2007.

FIELD OF THE INVENTION

The field of the invention is water removal from oily water, and especially oily water from distillation columns in natural gas and refinery fractionation plants.

BACKGROUND OF THE INVENTION

Separation of oil and water from oily water is a common task in many hydrocarbon processing facilities, and there are numerous manners of such separation known in the art. For example, U.S. Pat. No. 4,088,578 describes a system in which oil and water are separated using a settling scheme based on the specific gravities of the water and oil. Alternatively, as exemplarily described in U.S. Pat. No. 4,359,386, a plurality of filters is used for separation of oil from water. In still further known methods, a cyclone-stripper combination may be employed as shown in U.S. Pat. No. 5,368,700. Distillation, typically at reduced pressure, has been disclosed is U.S. Pat. No. 5,980,694. Similarly, U.S. Pat. No. 4,089,662 teaches a vaporizer that is coupled to a column to separate the water phase from oily water produced in the column. In yet further known methods, U.S. Pat. No. 5,100,546 teaches use of a chemical absorbent, while U.S. Pat. No. 5,188,742 discloses a process in which the oil that is separated from the oily water is combusted.

While most of such systems are at least somewhat effective for their intended purpose, most if not all of those methods have significant disadvantages when employed in the on-line separation of water from oily water produced in a column. It should be noted that water that is dissolved and entrained in refinery and natural gas plant feed gases often creates fractionation difficulties, especially in deethanizer columns where water tends to become trapped and cause excessive internal reflux and product losses. Moreover, oily water from a column is typically not suitable for discharge into a sewer or the environment as such water is contaminated with sulfurous compounds (e.g., mercaptans and $H_2S$), heavy hydrocarbons (e.g., benzene and toluene), and/or other undesirable components.

To circumvent difficulties associated with excess water in separation columns, the column bottom temperature is typically increased to drive the water content overhead. While such method is conceptually relatively simple and often removes significant quantities of water from the column, significant operational disadvantages remain. For example, higher reboiler duties are generally required for such operation, which increases flooding and steam demand. Moreover, higher bottoms temperatures also often result in product losses. For instance, increasing bottom temperature from 220° F. to 240° F. in a deethanizer column typically accounts for 10% to 20% propane losses. Other known methods of water removal have proved to be equally ineffective and costly. For example, a chimney tray can be incorporated with sufficient residence time for water oil separation. However, a calming zone that is required for phase separation rarely exists inside the fractionation column (e.g., due to the turbulent environment), rendering such alternatives often ineffective, if not impossible.

Therefore, while various oil water separation devices and methods are known in the art, all or almost all of them suffer from one or more disadvantages, especially where oily water separation is required for stable column operation. Consequently, there is still a need for improved configurations and methods of oil water separation, especially for separation columns.

SUMMARY OF THE INVENTION

The present invention is directed to configurations and methods of preferably on-line water removal from oily water that is produced during operation of a separation column by withdrawing the oily water from the column during separation. The so withdrawn oily water is then separated in an external separator into a water phase and an oily phase, and the oily phase is then heated to produce a density differential that is effective to drive the oily phase back into the operating column.

In one aspect of the inventive subject matter, a water removal apparatus for removal of water in a separation column has a separator that is fluidly and externally coupled to the separation column and that is further configured to allow separation of water from an oily water to so form (most typically by passive phase separation) a water phase and an oil phase. A feed line is fluidly coupled to the separator and the column to provide the oily water to the separator, and a return line is fluidly coupled to the separator and the column to provide oil from the oil phase back to the column. In most preferred aspects, a thermal control unit is thermally coupled to the return line and configured to raise the temperature of the oil in the return line to promote a density-driven flow of the oil from the separator back to the column through the return line.

Most typically, the separator has a volume that is chosen relative to product flow in the column such as to allow for a residence time of the oily water in the separator that is effective to allow for gravity separation of the phases (e.g., at least 15 minutes). It is further generally preferred that the column and the separator are configured to operate at substantially the same pressure (i.e., pressure difference no greater than 10 psi). In typical exemplary devices and methods, the separator is configured to operate at a pressure of between 100 psi and 500 psi. It is further generally preferred that the thermal control unit comprises an electric heater or a steam heater, wherein the electric heater or the steam heater are configured to allow raising of the temperature of the oil in the return line in an amount of at least 5° F. (more typically 10-15° F., or even higher) relative to the temperature of the oil in the oily water. The thermal control unit may further comprise a control circuit that receives temperature information and flow data from the oil in the return line. Where desirable, the apparatus may further comprise an oil-water interface level sensor that is coupled to the separator, and/or a coalescing element or other device to assist in phase separation.

Therefore, a method of removing water from oily water produced in a separation column while operating the separation column includes a step of withdrawing oily water from the column and separating the oily water in a separator that is external to the column to thereby form a water phase and an oil phase. In another step, at least part of the oil phase is heated to a temperature effective to generate a density difference that is sufficient to move the heated oil phase back to the column.

Most preferably, the separator has a volume relative to product flow in the column to thereby allow for a residence time of the oily water in the separator that is effective for gravity separation of the phases (e.g., at least 15 minutes), and/or the column and the separator are operated at substantially the same pressure. In preferred aspects of the inventive subject matter, the separator is operated at a pressure of between 100 psi and 500 psi. It is further generally preferred that at least part of the oil phase is heated in a return line using an electric heater or a steam heater, and that the heater raises the temperature of the oil phase in the return line in an amount of at least 5° F. relative to the temperature of the oil phase in the oily water. Where desired, a control circuit may be included that receives temperature information and flow data from the oil phase in the return line, and/or an oil-water interface level sensor may be included. It is still further contemplated that the oily water can be separated using numerous manners. However, it is especially preferred that the separation uses density settling and an optional coalescing element.

Various objects, features, aspects and advantages of the present invention will become more apparent from the following detailed description of preferred embodiments of the invention.

BRIEF DESCRIPTION OF THE DRAWING

FIG. 1 is an exemplary configuration for water removal of oily water in a distillation column according to the inventive subject matter.

DETAILED DESCRIPTION

The present invention is directed to devices and methods for external water separation of an oily water stream from a distillation column. Preferably, separation is performed on-line and the separated oil is fed back to the column while the water removed from the system has a purity that is sufficient to allow disposal or re-use of the water in the facility.

In an especially preferred aspect, contemplated devices comprise an oily water feed line that provides the oily water from the column to an oily water separator. The separator further includes a water outlet line and an oil return line that is configured to feed the oil back to the distillation column. Most typically, the separator also includes a coalescence element to further enhance water/oil separation. In especially preferred configurations and methods, a heater (e.g., electric resistance heating element) is thermally coupled to the oil return line and/or separator to allow raising the temperature of the oil to a degree effective to induce return oil flow via density difference between the separated oil in the return line and the feed oily water in the inlet line.

One exemplary configuration is depicted in FIG. 1 in which the oily water stream 1 is removed from a side draw nozzle of a distillation column 11 via a down-corner 12. While FIG. 1 depicts only a single nozzle, it should be understood that two and most preferably three or more side draw nozzles can be implemented to ensure complete water removal from the distillation column. Similarly, while FIG. 1 depicts only a single level at which oily water is removed, oily water removal at multiple levels is also contemplated. In such case, each level can feed the oily water to the same or distinct external separators. Consequently, multiple feed and return lines are also expressly contemplated. Stream 1, typically at 200 psig and 100° F., flows to separator 13. The separator 13 is preferably configured such that the oily water in the separator has sufficient residence time (e.g., 15 minutes or more) to allow the oily water to separate into the water phase and the oil phase via gravity. Alternatively, or additionally, a coalescing element 19 can be used for improved and/or faster separation.

In especially preferred aspects, oil from the oil phase is removed from the separator 13 via stream 2 without use of a pump or other mechanical device, and most preferably by using a thermal mechanism by which the oil temperature in the oil return line is raised to thereby create a differential in fluid density. As the heated oil rises, the oil is fed back to the column. The heat source for oil heating may be electric tracer elements and/or low pressure steam, most preferably in an amount such that the oil temperature in stream 2 is increased by about 5° F. to about 15° F. (or higher) as compared to the feed stream 1. In a typical embodiment, a process signal from the temperature controller 18 and flow controller 17 are fed to a heating control circuit and/or heat source 16 that adjusts the heat input as necessary for the desirable circulation. Furthermore, it is generally preferred that the separator 13 uses an interface level sensor and controller 15 that maintains the water level in separator 13 at a predetermined level by removing water as stream 3 from the separator using interface control valve 14.

Therefore, it should be appreciated that a water removal device for removal of water in a separation column will generally include an external separator that is fluidly coupled to the separation column and that allow separation of water from oily water into a water phase and an oil phase. The separator is typically coupled to the column via a feed line to provide the oily water to the separator and via a return line to provide the oil from the oil phase back to the column. As the oil is most preferably moved via thermal energy, a thermal control unit will be thermally coupled to the return line to raise the temperature of the oil in the return line sufficiently high to promote a density-driven flow of the oil from the separator to the column through the return line.

With respect to the separator it is generally preferred that the separator is external to the column and that the separator is fluidly coupled to the column to receive the oily water and to return the oil separated from the oily water. Where desirable, it should be noted that more than one separator may be used, wherein the additional separator(s) may receive the oily water from the column from the same or different levels. Moreover, it is contemplated that at least two separators may be fluidly coupled to each other in series or in parallel. Regardless of the number of separators, it is contemplated that the volume of the separator(s) is selected such that on-line separation can be performed. Viewed from a different perspective, and next to the volume of oily water from the column, the manner of separation will at least in part determine the volume of the separator(s). In one preferred configuration, the separator has a volume relative to product flow in the column such as to allow for a residence time of the oily water in the separator that is effective to separate the water phase from the oil phase via gravity settling.

Alternatively, or additionally, one or more separation methods other than gravity settling may be employed in (or in conjunction with) the separator to further reduce the size of the separator. Suitable separation methods include various physical methods, and especially use of one or more coalescing elements, centrifugal separators (e.g., hydrovortex), filtration, and so forth. Similarly, numerous chemical separation methods are also deemed suitable and include, inter alia, de-emulsification, etc. Still further contemplated alternative or additional separation methods include thermal separation, and particularly evaporation and distillation. Consequently, it should be noted that suitable separation times will therefore vary considerably and will typically be in the range of between 1 and 30 minutes, and even longer.

The separator is typically operated at substantially the same pressure (i.e., at a pressure difference of no more than 15%) as the column and in most cases the typical pressures are in the range of 20 psi to 1000 psi, and even more typically between 100 psi and 500 psi. While not limiting to the inventive subject matter, pressures greater than atmospheric pressure are generally preferred rather than partial vacuum.

In further especially preferred aspects of the inventive subject matter, oil is fed back to the column using a non-mechanical mechanism to reduce or even eliminate energy use and/or maintenance requirements. For example, suitable non-mechanical mechanisms include those in which the oil is heated to reduce density and so drive the oil back to the column. Among other suitable manners, a heater (e.g., heated by electricity, steam, heat exchange fluid from other processes) may be employed to heat the oil phase and/or the oil in the return line. Most preferably, however, the oil is heated in the return line to thereby promote oil flow back to the column. In other examples, the separator may be positioned above level from which the oily water is drawn and a pressure gradient may be used to move the oily water into the separator. Gravity-based pressure may then be used to move the oil back to the column. Alternatively, or additionally, the oil may also be moved using a pump or other component (e.g., eductor, etc.).

Regardless of the manner of driving the oil back to the column, it is preferred that a control circuit is employed to control the rate of oil flow back to the column. For example, where the oil is moved using an electrical heating mechanism, it is generally preferred that a temperature sensor is used to measure the oil temperature in the oil return line. The control circuit then adjusts the electrical current to the electric (e.g., resistance) heating elements on the oil return line to so adjust the density of the oil and with that the flow rate of the oil back into the column. Most typically, the temperature difference between the oil in the oily water and the oil in the return line can be relatively moderate to effect the density difference and with that the movement of the oil back to the column. For example, it is contemplated that the electric heater or steam heater are configured to allow raising of a temperature of the oil in the return line in an amount of at least 5° F. (typically between 5° F. and 100° F., more typically between 10° F. and 80° F., and most typically between 15° F. and 50° F.) relative to the temperature of the oil in the oily water.

Where desired, the control circuit may further receive a signal from a flow sensor that measures oil flow in the oil return line to so maintain a desirable oil flow. Of course, it should be noted that the controller functions may be integrated into a single unit, or that separate (optionally interconnected) control circuits may be employed. Additionally, the separator may also be coupled to a water oil interface level detector that detects the oil/water interface to allow for controlled water drainage from the separator (e.g., by using a control valve functionally coupled to the level sensor). With respect to suitable columns it is generally contemplated that all separation columns are appropriate for use herein, however, especially contemplated separation columns comprise those in which hydrocarbons are separated. For example suitable columns especially include deethanizers.

Consequently, the inventors also contemplate a method of removing water from oily water produced in a separation column while operating the separation column. In especially preferred methods, oily water is withdrawn from the column and separated in a separator that is external to the column to form a water phase and an oil phase. At least part of the oil phase is then heated to a temperature effective to generate a density difference that is sufficient to move the heated oil phase back to the column while the column is operating. With respect to the column, the separator, and the control unit, the same considerations as provided above apply. Among various other advantages, it should be appreciated that contemplated devices and methods allow for oil recycling to the distillation column for increased product recovery while reducing or even eliminating problems associated with disposal of oily water. Still further, it should be noted that contemplated systems and methods allow on-line operation at significantly reduced operational complexity and energy requirements.

Thus, specific embodiments and applications of water removal from oily water in distillation columns have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A water removal apparatus for removal of water in a separation column, comprising:
   a separator fluidly and externally coupled to the separation column and configured to receive an oily water from the separation column and to allow separation of water from the oily water into a water phase and an oil phase, wherein the separation column is configured to receive a water-containing hydrocarbon feed and to separate hydrocarbons;
   a feed line that is fluidly coupled to the separator and the column such that the feed line provides the oily water from a side draw of the separation column to the separator;
   a return line that is fluidly coupled to the separator and the column such that the return line provides oil from the oil phase to the column; and
   a thermal control unit thermally coupled to the return line and configured to allow raising a temperature of the oil in the return line in an amount effective to promote density-driven flow of the oil from the separator to the column through the return line, and
   wherein the thermal control unit comprises an electric heater or a steam heater that are configured to allow raising of a temperature of the oil in the return line in an amount of at least 5° F. relative to the temperature of the oil in the oily water.

2. The apparatus of claim 1 wherein the separator has a volume relative to product flow in the column to thereby allow for a residence time of the oily water in the separator effective to separate the water phase from the oil phase via gravity settling.

3. The apparatus of claim 1 wherein the column and the separator are configured to allow operation at substantially the same pressure.

4. The apparatus of claim 1 wherein the separator is configured to allow operation at a pressure of between 100 psi and 500 psi.

5. The apparatus of claim 1 wherein the thermal control unit further comprises a control circuit that is configured to receive temperature information and flow data of the oil in the return line.

6. The apparatus of claim 1 further comprising an oil-water interface level sensor that is coupled to the separator.

7. The apparatus of claim 1 further comprising a coalescing element disposed within the separator to thereby enhance separation of the oily water into the water phase and the oil phase.

8. A method of removing water from oily water produced in a separation column while operating the separation column, comprising the steps of:
   feeding a water-containing hydrocarbon feed into the separation column and operating the separation column to separate hydrocarbons;
   withdrawing from a side draw of the separation column oily water and separating the oily water in a separator that is external to the column to thereby form a water phase and an oil phase;
   heating at least part of the oil phase to a temperature effective to generate a density difference that is sufficient to move the heated oil phase back to the column while the column is operating; wherein the at least part of the oil phase is heated in a return line using an electric heater or a steam heater; and
   wherein the electric heater or the steam heater raise a temperature of the oil phase in the return line in an amount of at least 5° F. relative to the temperature of the oil phase in the oily water.

9. The method of claim 8 wherein the separator has a volume relative to product flow in the column to thereby allow for a residence time of the oily water in the separator effective to separate the water phase from the oil phase via gravity settling.

10. The method of claim 8 wherein the column and the separator are operated at substantially the same pressure.

11. The method of claim 8 wherein the separator is operated at a pressure of between 100 psi and 500 psi.

12. The method of claim 8 further comprising a step of measuring an oil-water interface using a level sensor that is coupled to the separator.

13. The method of claim 8 wherein the step of separating the oily water includes use of a coalescing element.

* * * * *